United States Patent Office 3,761,249
Patented Sept. 25, 1973

3,761,249
COPPER EXTRACTION FROM AMMONIACAL SOLUTIONS
Gordon Malcolm Ritcey and Bernard Henry Lucas, Ottawa, Ontario, Canada, assignors to Canadian Patents and Development Limited, Ottawa, Ontario, Canada
Filed Mar. 4, 1971, Ser. No. 121,006
Claims priority, application Canada, Mar. 11, 1970, 77,110
Int. Cl. C22b 15/08
U.S. Cl. 75—101 BE
11 Claims

ABSTRACT OF THE DISCLOSURE

The invention relates to a solvent extraction process for separating dissolved copper from an aqueous ammoniacal solution also containing dissolved cobalt and nickel, the solution having a concentration of at least 50 grams ammonium salt per litre. The process comprises contacting said aqueous solution at pH 6.5 to 8.5 with an α-hydroxy oxime whereby the copper values are extracted from the aqueous phase into the organic phase, and separating the resultant copper loaded organic phase from the remaining aqueous raffinate phase containing the cobalt and nickel in solution.

Figure 1:
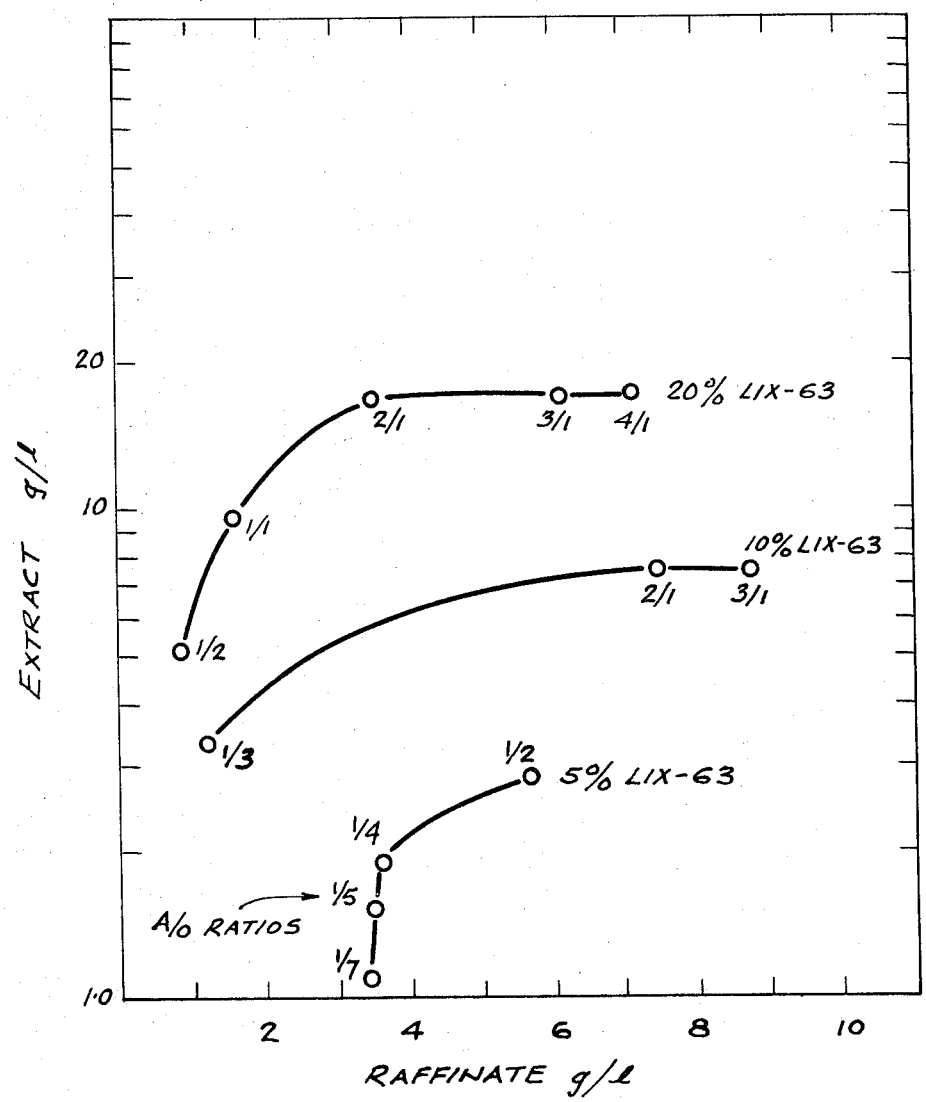

BACKGROUND OF THE INVENTION (1) Field of the invention

This invention relates to a solvent extraction process for separating copper from an ammoniacal solution in which it is dissolved, particularly from an ammonium sulphate leach solution also containing dissolved cobalt and nickel.

(2) Description of the prior art

Nickel sulfide ores are at present commercially processed by pressure leaching at elevated temperatures using ammonium hydroxide. Subsequently, dissolved copper, nickel and cobalt are recovered from this leach solution by precipitation techniques involving several unit processes as well as many pieces of equipment.

The copper is precipitated as a sulfide from the ammoniacal sulphate leach solution by distillation of the ammonia and control of the polythionates, together with sulphuric acid pH adjustment. The residual copper remaining in solution is removed by precipitation with hydrogen sulfide.

The system described above has many disadvantages. Firstly, many process steps are necessary to achieve pure copper free solutions. Moreover, many pieces of process equipment as well as relatively large processing areas are required.

It has been previously demonstrated that α-hydroxy oximes are a class of extraction reagents which are especially selective to copper in either sulphuric acid leach solutions or ammoniacal liquors. Recovery of copper from such solutions is described in Swanson, U.S. Pat. No. 3,224,873 issued Dec. 21, 1965.

It might, therefore, have been expected that the α-hydroxy oximes of the above class could be used to recover copper from concentrated ammonium sulphate leach solutions by following the teachings of the patent. However, this was not found to be the case. Thus, the Swanson patent did show that with no other metals present, copper values could be extracted from ammoniacal solutions by means of α-hydroxy oximes at a pH of 9.92. However, tests have been conducted on the extraction of copper values from concentrated ammonium sulphate solutions also containing dissolved cobalt and nickel at a pH of 9 and very poor separation of copper from the cobalt and nickel was achieved.

SUMMARY OF THE INVENTION

It has, therefore, been very surprisingly discovered that the α-hydroxy oximes can be employed to effectively extract copper from aqueous ammoniacal leach solutions also containing cobalt and nickel if the extraction is conducted within the relatively limited pH range of about 6.5 to 8.5. At pH values below 6.5, difficulties are encountered because of precipitation of the metals while at pH values above 8.5 very poor separation is achieved. Optimum separation is obtained within a pH range of about 7-8.

Thus, according to the present invention copper is separated from an aqueous ammoniacal solution also containing dissolved cobalt and nickel, the solution having a concentration of at least 50 grams ammonium salt per litre, by contacting this aqueous solution at a pH of about 6.5 to about 8.5 with an α-hydroxy oxime, whereby the copper values are extracted from the aqueous phase to the organic extract phase and separating the resultant copper loaded organic phase from the remaining aqueous raffinate phase containing the cobalt and nickel in solution.

DESCRIPTION OF THE PREFERRED EMBODIMENTS

The cobalt and nickel can be separated and recovered by known techniques or by a further solvent extraction process such as that described in Ritcey and Lucas, copending U.S. application, Ser. No. 109,899 filed Jan. 26, 1971.

The α-hydroxy oximes have the following general formula:

$$\begin{array}{ccc} & OH & NOH \\ & | & \| \\ R-&C-&C-R' \\ & | & \\ & R'' & \end{array}$$

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups containing from about 6 to 20 carbon atoms. R and R' are also preferably the same and, when alkyl, are preferably attached to the carbons substituted with the —OH and =NOH groups through a secondary carbon atom. It is also preferred that R'' be hydrogen, an unsaturated hydrocarbon, of a branched chain alkyl group containing from about 6 to 20 carbon atoms. The α-hydroxy oximes also preferably contain a total of from about 14 to about 40 carbon atoms.

Representative α-hydroxy oxime compounds which are suitable for this use are 19-hydroxyhexatriaconta-9,27-dien - 18 - oxime; 5 - 10 - diethyl-8-hydroxytetradecen-7-oxime; and 5,8 - diethyl - 7-hydroxy-dodecane-6-oxime. The latter compound has the following structural formula:

$$\begin{array}{c} CH_3 \\ | \\ CH_2 \quad OH \quad NOH \quad H \\ | \quad\;\; | \quad\;\; \| \quad\;\; | \\ CH_3-(CH_2)_3-C----C----C--------C-(CH_2)_3CH_3 \\ | \quad\;\; | \quad\quad\quad\quad\;\; | \\ H \quad\; H \quad\quad\quad\quad\; CH_2 \\ \quad\quad\quad\quad\quad\quad\quad\quad | \\ \quad\quad\quad\quad\quad\quad\quad\quad CH_3 \end{array}$$

Representative of other mono- and polyunsaturated radicals are heptenyl, octenyl, decenyl, octadecenyl, octadecynyl and alkyl substituted radicals, such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oximes are usually made up in 0.1 to 0.4 molar solutions and are prepared in a suitable water insoluble hydrocarbon solvent, such as kerosene, in which the α-hydroxy oxime has a solubility of at least 2% by weight. A broad range of other insoluble liquid hydrocarbons can also be used as solvents, for example gasoline, benzenes, toluenes, naphthols and higher alcohols.

The contacting of the copper, cobalt and nickel-bearing aqueous solutions with the solvent extraction reagent may be carried out by any of the well-known procedures employed in liquid-liquid extractions. Although continuous countercurrent methods are preferred, batch, continuous batch and batch-countercurrent methods are also useful. Any suitable liquid-liquid contacting system may be employed such as a pulse column, a countercurrent rotating disc column, and the like. The temperature at which the mixing and extraction is carried out is not critical with temperatures over the range of 25–55° C. showing no effects on the extraction.

Although the process of this invention is particularly concerned with separating copper from cobalt and nickel in concentrated ammonium sulphate solutions, other salts such as nitrates, carbonates, etc. can be used. The salt concentration of the solution may vary from about 50 grams/litre up to the saturation point (about 531 grams $(NH_4)_2SO_4$/litre). In order to maintain a high separation factor between the copper and other metals, the salt concentration is preferably kept not higher than 300 g./l. There is also a relationship between the salt concentration and pH so that, for example, at a pH of about 8.5 the concentration of ammonium sulphate should be kept no higher than about 250 g./l., while somewhat higher concentrations can be tolerated at pH 8.

The ammoniacal feed solution would normally contain about 0.1 to 50 g./l. of each of copper, cobalt and nickel, but these concentrations are in no way critical.

The ratio of the volume of organic phase to the aqueous phase can be varied considerably and the most efficient ratio in each case can be easily determined by one skilled in the art. However, generally the aqueous to organic ratio will be within the range of about 1/5 to 5/1, depending on the metal concentration, concentration of extraction reagent, etc.

After the copper values have been transferred to the organic phase and the aqueous and organic phases separated, the organic phase can either be transferred to a scrubber of known design to remove residual nickel or transferred directly to a stripping circuit. The amount of this residual nickel can be kept to a very low level during extraction by stagewise contact with the α-hydroxy oxime, e.g. in a pulse column where many stages of contact are inherently available. Thus, depending on the number of contacts, degree of purity required, etc., the scrubbing stage may not be necessary. When the scrubber is used, the organic phase is advantageously contacted with an ammoniacal solution containing 5–50 g./l. of a copper salt, e.g. copper sulphate at about pH 8.

The stripping circuit can be any suitable liquid-contactor. In the stripping circuit, the copper-containing organic phase can be conveniently contacted with a mineral acid solution, e.g. sulphuric, nitric or hydrochloric acid, the choice of acid depending on the copper salt desired. The copper is readily stripped from the solution by use of these acids and nitric and sulphuric acids have been found to be particularly effective. When the organic phase is contacted with the acid solution, the metal value dissolves in the acid (as the corresponding metal salt) and the α-hydroxy oxime can be recovered for extracting fresh feed solution.

The copper can be collected as a copper salt or it can be converted to the oxide and, if desired, the oxide can be reduced to metal powder.

Figure 2:
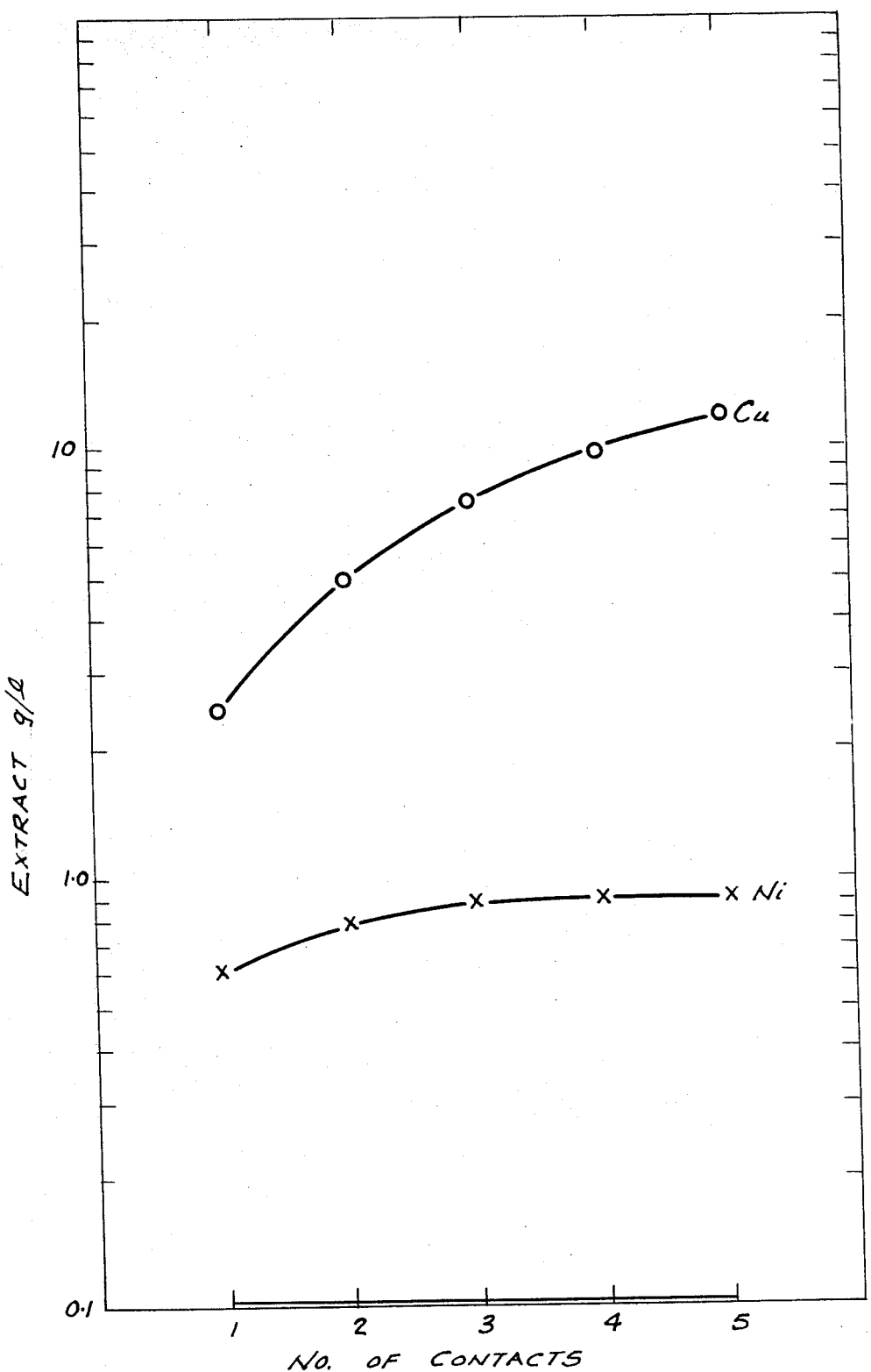
Figure 3:
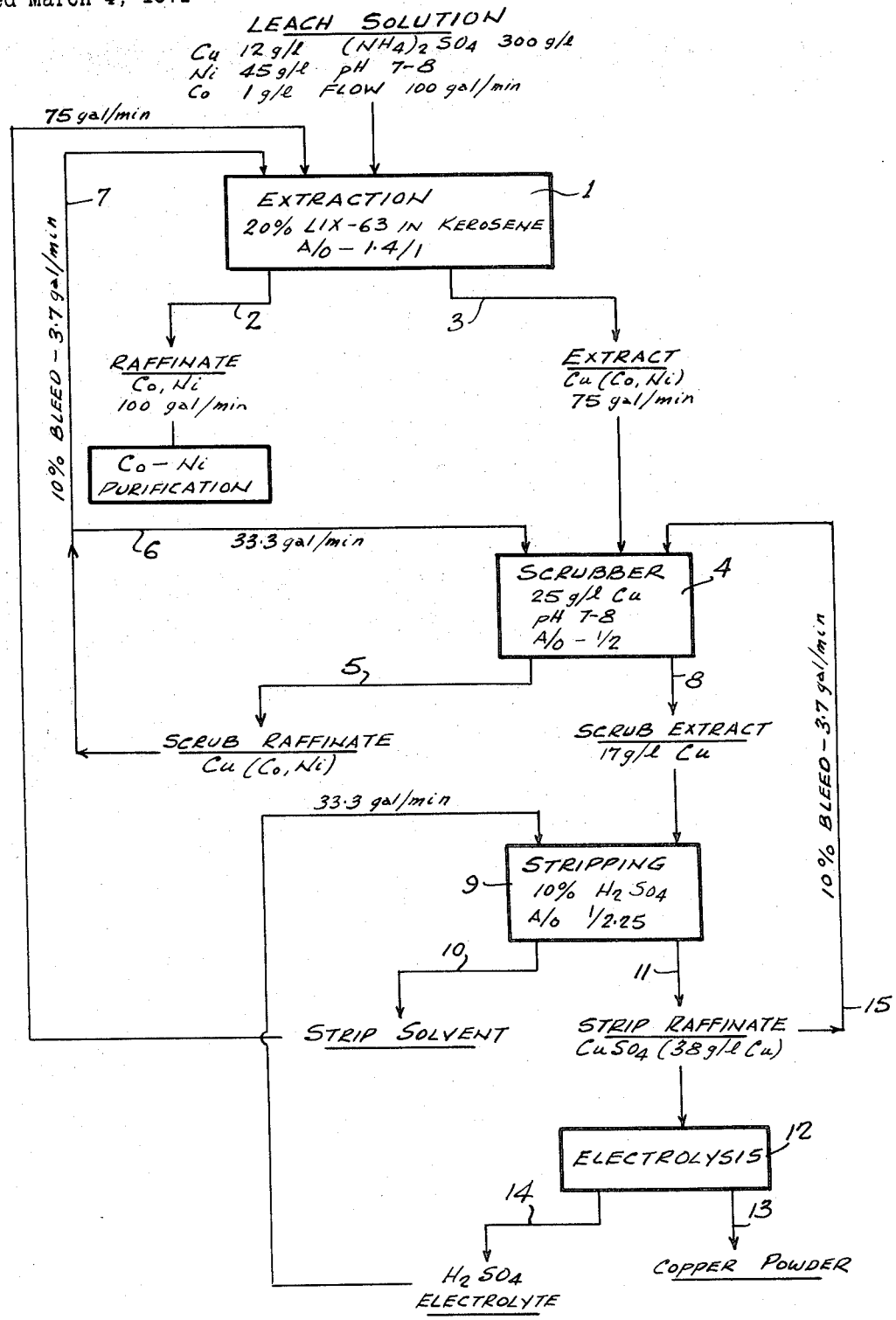

The invention is illustrated by the attached drawings in which:

FIG. 1 is a series of extraction curves for different concentrations of extraction reagent, FIG. 2 shows extraction curves for multiple contact stages, and FIG. 3 is a schematic flow sheet illustrating a typical commercial operation.

The invention is illustrated by the following non-limitative examples.

EXAMPLE 1 (EXTRACTION)

A series of extraction tests were performed on a solution containing 5 g./l. Cu, 5 g./l. Ni and 5 g./l. Co, at ammonium sulphate concentration levels of 50 to 500 g./l. $(NH_4)_2SO_4$. The extraction reagent used was LIX–63 (trademark of General Mills, Inc.) as a 5% solution in Shell 140 Flash Naphtha, the pH level of the feed was varied from 6.5 to 9.0, the aqueous/organic ratio was 1/1 and the extractions were at room temperature.

The results were as follows:

TABLE I

| $(NH_4)_2SO_4$ Conc., (g./l.) | Feed, pH | Extraction coefficient $(E_a^\circ)$, Cu | Separation factor Cu/Ni | Separation factor Cu/Co |
|---|---|---|---|---|
| 50 | 6.5 | (¹) | | |
|    | 7.0 | 2.96 | 107 | 93 |
|    | 7.5 | 2.96 | 173 | 156 |
|    | 8.0 | 2.77 | 247 | 158 |
|    | 9.0 | 1.7 | 20 | 8 |
| 100 | 6.5 | 10.7 | 825 | 825 |
|     | 7.0 | 2.81 | 592 | 625 |
|     | 7.5 | 3.06 | 150 | 150 |
|     | 8.0 | 2.85 | 200 | 160 |
|     | 9.0 | 1.0 | 20 | 5 |
| 200 | 6.5 | 5.1 | 425 | 425 |
|     | 7.0 | 3.74 | 203 | 232 |
|     | 7.5 | 3.08 | 171 | 154 |
|     | 8.0 | 2.6 | 130 | 21 |
|     | 9.0 | 0.30 | 15 | 3 |
| 300 | 6.5 | 8.5 | 355 | 370 |
|     | 7.0 | 3.8 | 238 | 238 |
|     | 7.5 | 2.7 | 150 | 60 |
|     | 8.0 | 1.9 | 14 | 10 |
|     | 9.0 | 0.2 | 9 | 3 |
| 500 | 6.5 | 4.4 | 210 | 200 |
|     | 7.0 | 1.04 | 40 | 23 |
|     | 7.5 | 0.65 | 40 | 11 |
|     | 8.0 | 0.22 | 18 | 3 |
|     | 9.0 | 0.18 | 2 | 3 |

¹ Precipitation occurred.

From the above data, it will be seen that there is a very significant drop in both extraction coefficient $(E_a^\circ)$ and in separation factor at pH 9.0. It was also found that at pH 6.5, a temperature of 35–45° C. was required to maintain solubility of the metal salts.

It can also be seen that particularly high extraction coefficients and separation factors are obtained at relatively high ammonium sulphate concentrations, e.g. 100–300 g./l.

EXAMPLE 2 (EXTRACTION)

An ammonium sulphate solution was prepared having the analysis of the typical plant leach liquor from ammonia leaching of a nickel, cobalt, copper concentrate. The analysis was 45.8 g./l. Ni, 11.2 g./l. Cu, 0.82 g./l. Co and 272 g./l. $(NH_4)_2SO_4$.

A series of extractions were performed on the above solution at pH 8.0 with LIX–63 at varied concentrations in Shell 140 Flash Naphtha and a variety of aqueous/organic ratios. The results are shown in FIG. 1 and indicate a fairly linear relationship between maximum copper loading and LIX–63 concentration. A saturation loading of 17 g./l. Cu resulted with the use of 20% by volume of LIX–63.

EXAMPLE 3 (EXTRACTION)

Using the same feed composition as in Example 2, a series of batch shake-outs were performed to determine if, by successive contact of the loaded extract with fresh aqueous feed solution, the purity of the copper in the extract would be improved.

The extraction reagent was a 20% by volume solution of LIX–63 in Shell 140 kerosene. Volumes of organic and aqueous phases, at ratios of O/A of 4/1 were contacted and after separation of these two phases, the organic phase is contacted with fresh aqueous feed solution, again at an O/A ratio of 4/1. This procedure was repeated five times.

The results are shown in FIG. 2 and it will be seen that saturation loading was not achieved after five contact stages. The co-extraction of nickel and cobalt both remained low.

EXAMPLE 4 (SCRUBBING AND STRIPPING)

A series of scrubbing tests were carried out on a 20% by volume LIX-63 copper extract in kerosene using a 20-25 g./l. Cu solution of copper sulphate as the scrub medium. At an aqueous/organic ratio of 1/1 the extract was contacted three successive times with the scrub solution at varying pH levels between 1 and 8. The scrubbed extract was then stripped with 5% $HNO_3$ at an aqueous/organic ratio of 1/1.

The results are shown in Table II below:

TABLE II

| Aqueous scrub solution | | | | Cu/Ni weight ratio in strip |
|---|---|---|---|---|
| Cu (g./l.) | Ni (g./l.) | Co (g./l.) | pH | |
| 24.0 | 0.002 | 0.001 | 1 | 17.6 |
| 24.2 | 0.002 | 0.001 | 3 | 88.8 |
| 20.8 | 0.001 | 0.001 | 6.5 | 279 |
| 20.4 | 0.002 | 0.001 | 8.0 | 805 |

The above results indicate increased scrubbing efficiency with an increase in pH from 1 to 8. The initial Cu/Ni ratio in the feed extract of 7 was increased to a ratio of 805 by scrubbing at pH 8.0.

EXAMPLE 5 (STRIPPING)

Stripping tests were carried out on a loaded 5% by volume LIX-63-kerosene extract containing 2.4 g./l. Cu and 0.03 g./l. Ni. Varying concentrations of nitric and sulphuric acid were used at room temperature with an aqueous/organic ratio of 1/1 and a shake-out time of 2 minutes.

The results are shown below in Table III.

TABLE III

| Acid strip solution | Strip raffinate (g./l.) | |
|---|---|---|
| | Ni | Cu |
| 0.5% $HNO_3$ | 0.03 | 0.31 |
| 1.0% $HNO_3$ | 0.03 | 0.52 |
| 3.0% $HNO_3$ | 0.03 | 2.19 |
| 5.0% $HNO_3$ | 0.03 | 2.38 |
| 10.0% $HNO_3$ | 0.03 | 2.33 |
| 0.5% $H_2SO_4$ | 0.02 | 0.21 |
| 1.0% $H_2SO_4$ | 0.02 | 0.21 |
| 2.0% $H_2SO_4$ | 0.02 | 0.23 |
| 5.0% $H_2SO_4$ | 0.02 | 0.30 |
| 10.0% $H_2SO_4$ | 0.03 | 1.5 |
| 20.0% $H_2SO_4$ | 0.01 | 2.3 |
| 30.0% $H_2SO_4$ | 0.03 | 2.4 |

EXAMPLE 6

Additional stripping tests were conducted on a loaded 20% LIX-63-kerosene extract, using 10% $H_2SO_4$. The extract contained 1.96 g./l. Ni, 12.13 g./l. Cu and 0.012 g./l. Co. Four stages of stripping were conducted at an aqueous/organic ratio of 1/1 and at 25° C.

The results for each stage are shown in Table IV following:

TABLE IV

| Acid strip solution | Strip raffinate analysis, g./l. | | | Cumulative percent copper |
|---|---|---|---|---|
| | Ni | Cu | Co | |
| 10% $H_2SO_4$ at 25° C | 0.53 | 6.9 | 0.012 | 57 |
| Do | 0.039 | 3.6 | 0.001 | 87 |
| Do | 0.047 | 1.2 | 0.0005 | 97 |
| Do | 0.033 | 0.23 | 0.0005 | 98.9 |

EXAMPLE 7

A series of tests were carried out on a synthetic feed solution, containing about 45 g./l. Ni, 12 g./l. Cu, and 1 g./l. Co, in 272 g./l. of either $(NH_4)_2SO_4$, $(NH_4)_2CO_3$, $NH_4Cl$ or $NH_4NO_3$. The feed pH was 8.0, and the A/O ratio was 2/1 for shakeouts carried out for 2 minutes using 10% LIX-63 in kerosene previously equilibrated with acid. The extracts were readily stripped with 10% $HNO_3$ at an A/O ratio of 2/1.

The results obtained are shown in Table V below.

TABLE V

| System | Sample | Analysis, g./l. | | | Equilibrated pH | Strip ratio (by weight) | |
|---|---|---|---|---|---|---|---|
| | | Cu | Ni | Co | | Cu/Ni | Cu/Co |
| $(NH_4)_2SO_4$ | Feed | 11.5 | 45.1 | 1.15 | 8.02 | | |
| | Raffinate strip | 7.46 | 0.38 | 0.019 | | 9.8 | 196 |
| $(NH_4)_2CO_3$ | Feed | 12.7 | 50.1 | 0.94 | 8.35 | | |
| | Raffinate strip | 7.46 | 0.24 | 0.006 | | 15.5 | 62 |
| $NH_4NO_3$ | Feed | 10.7 | 41.8 | 1.04 | 8.30 | | |
| | Strip | 7.30 | 0.20 | 0.013 | | 18.2 | 281 |
| $NH_4Cl$ | Feed | 12.9 | 43.4 | 0.49 | 8.38 | | |
| | Strip | 2.72 | 0.042 | 0.084 | | 32.4 | 16.2 |

EXAMPLE 8 (FLOWSHEET)

A flowsheet for a typical commercial scale extraction according to the invention is shown in FIG. 3.

An aqueous plant leach solution containing 12 g./l. Cu, 45 g./l. Ni, 1 g./l. Co and 300 g./l. $(NH_4)_2SO_4$ at pH 7-8 flows into a continuous liquid-liquid contacting unit 1 at a rate of 100 gal./min. In the extraction unit 1 the leach solution is contacted with 20% LIX-63 in kerosene at an aqueous to organic ratio of 1.4:1.

A raffinate stream 2 containing the cobalt and nickel flows from the extraction unit 1. This stream can be further processed for cobalt and nickel purification.

An extract stream 3 also flows from unit 1 and this stream contains the extracted copper values as well as some residual cobalt and nickel. This extract stream 3 flows into scrubber 4 where it is contacted with an ammoniacal copper sulphate solution containing 25 g./l. copper at pH 7-8 and an aqueous to organic ratio of 1:2.

A raffinate stream 5 containing the residual cobalt and nickel flows from scrubber 4 and is recycled via stream 6 to the scrubber 4 as the aqueous phase in the scrubbing operation. In order to prevent a build up of nickel in recycle stream 6 a small portion of the raffinate, e.g. 10%, is also recycled to extraction unit 1 via recycle stream 7.

The extract stream 8 flowing from scrubber 4 proceeds to stripping unit 9 where it is contacted with a 10% solution of sulphuric acid at an aqueous to organic ratio of 1:2.25. The solvent stream 10 from stripping unit 9 is recycled to extraction unit 1 as the organic phase while the raffinate stream 11 proceeds to an electrolysis unit 12 which forms copper powder 13 and sulphuric acid 14. This sulphuric acid is recycled to the stripping unit 9 as the aqueous phase. A small portion of the strip raffinate stream 11, e.g. 10%, is recycled via stream 15 back to scrubber 4 to replace the portion of scrub raffinate 7 recycled to extraction unit 1.

Various changes in the details, steps, materials and arrangements of parts, which have herein been described and illustrated in order to explain the nature of the invention, may be made by those skilled in the art within the principle and scope of the invention, as defined in the appended claims.

We claim:
1. A process for separating copper from an aqueous ammoniacal solution containing dissolved cobalt and nickel, which comprises contacting an aqueous ammoniacal solution containing a combined total of 15 or more grams per liter of copper, nickel and cobalt and also containing at least 50 grams per liter of an ammonium salt selected from the group consisting of ammonium sulphate, ammonium carbonate, ammonium nitrate and ammonium chloride at pH 6.5 to 8.5 with an α-hydroxy oxime having the general formula

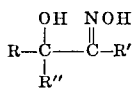

where R and R' are organic hydrocarbon radicals and R'' is hydrogen or an organic hydrocarbon radical whereby the copper values are extracted from the aqueous phase into the organic phase, and separating the resultant copper loaded organic phase from the remaining aqueous raffinate phase containing the cobalt and nickel in solution.

2. A process according to claim 1 wherein the aqueous ammoniacal solution has a concentration of 50–300 grams ammonium salt per litre.

3. A process according to claim 1 wherein the ammonium salt is ammonium sulphate.

4. A process according to claim 3 wherein the ammonium sulphate solution has a concentration in the range of 50–250 g./l.

5. A process according to claim 1 wherein the α-hydroxy oxime is dissolved in an inert organic diluent which is substantially immiscible with the aqueous solution.

6. A process according to claim 1 wherein the pH is in the range of about 7.0 to 8.0.

7. A process according to claim 1 wherein R and R' are unsaturated hydrocarbon or branched chain alkyl groups containing from about 6 to 20 carbon atoms and R'' is hydrogen, an unsaturated hydrocarbon or a branched chain alkyl group containing from about 6 to 20 carbon atoms.

8. A process according to claim 1 wherein a multiple stagewise contact with the α-hydroxy oxime is used.

9. A process according to claim 1 wherein the copper loaded organic phase is scrubbed with an aqueous copper salt solution.

10. A process according to claim 1 wherein the copper is stripped from the loaded organic phase by being contacted with a mineral acid solution.

11. A process according to claim 10 wherein the mineral acid is sulphuric, nitric or hydrochloric acid.

References Cited
UNITED STATES PATENTS

| | | | |
|---|---|---|---|
| 3,224,873 | 12/1965 | Swanson | 75—101 BE |
| 3,428,449 | 2/1969 | Swanson | 75—117 |
| 3,440,036 | 4/1969 | Spinney | 75—117 |
| 3,399,055 | 8/1968 | Ritcey et al. | 75—119 |
| 3,455,680 | 7/1969 | Ashbrook et al. | 75—117 |

GEORGE T. OZAKI, Primary Examiner

U.S. Cl. X.R.

75—117, 119; 23—312 R